United States Patent
Morsy et al.

(10) Patent No.: US 11,882,238 B1
(45) Date of Patent: Jan. 23, 2024

(54) SYSTEM AND METHOD FOR CUSTOMER IDENTIFICATION AND WORKFLOW OPTIMIZATION

(71) Applicant: MH SUB I, LLC, El Segundo, CA (US)

(72) Inventors: Ahmed Morsy, Burbank, CA (US); Joseph A. Rosenblum, Santa Monica, CA (US); Kevin Hayes, Pacific Coast Highway, CA (US)

(73) Assignee: MH Sub I, LLC, El Segundo, CA (US)

( * ) Notice: Subject to any disclaimer, the term of this patent is extended or adjusted under 35 U.S.C. 154(b) by 376 days.

(21) Appl. No.: 17/133,203

(22) Filed: Dec. 23, 2020

Related U.S. Application Data (60) Provisional application No. 62/953,402, filed on Dec. 24, 2019.

(51) Int. Cl.
| | |
|---|---|
| *H04M 3/42* | (2006.01) |
| *G06K 19/07* | (2006.01) |
| *G06Q 10/0631* | (2023.01) |
| *G06F 13/42* | (2006.01) |

(52) U.S. Cl.
CPC .... *H04M 3/42068* (2013.01); *G06F 13/4282* (2013.01); *G06K 19/0723* (2013.01); *G06Q 10/063112* (2013.01); *G06F 2213/0042* (2013.01)

(58) Field of Classification Search
None
See application file for complete search history.

(56) References Cited

U.S. PATENT DOCUMENTS

| | | | | |
|---|---|---|---|---|
| 5,696,809 A | * | 12/1997 | Voit | H04M 3/2254 |
| | | | | 379/267 |
| 6,661,882 B1 | * | 12/2003 | Muir | H04M 3/54 |
| | | | | 379/142.01 |
| 2001/0007589 A1 | * | 7/2001 | Uppaluru | H04M 3/5237 |
| | | | | 379/211.02 |
| 2009/0086947 A1 | * | 4/2009 | Vendrow | H04M 3/02 |
| | | | | 379/201.12 |
| 2009/0103709 A1 | * | 4/2009 | Conway | H04M 3/5175 |
| | | | | 379/265.09 |
| 2015/0189088 A1 | * | 7/2015 | Surridge | G06Q 10/063112 |
| | | | | 379/265.12 |
| 2015/0281444 A1 | * | 10/2015 | Busch | H04M 3/5133 |
| | | | | 379/265.09 |
| 2018/0176382 A1 | * | 6/2018 | Ristock | H04M 3/5191 |

* cited by examiner

*Primary Examiner* — Harry S Hong
(74) *Attorney, Agent, or Firm* — Rutan & Tucker, LLP (57) ABSTRACT

Embodiments described herein disclose a caller identification routing device including a main board that comprises a circuit board, a hardware processor affixed to the circuit board, one or more memories in communication with the processor, and a plurality of communication ports in communication with the processor. The plurality of ports includes a first plurality of analog telephone ports, and a second plurality of broadband communication ports. The routing device includes a first enclosure portion configured with three adjacent sides wherein a plurality slots disposed on opposing sides of the first housing portion are configured to slidably engage with the main board, and a second enclosure portion configured with three adjacent sides and a plurality of openings configured to couple with the plurality of communication ports of the main board, wherein the second enclosure portion can slidably engage with the first enclosure portion encasing the main board.

28 Claims, 7 Drawing Sheets

SYSTEM AND METHOD FOR CUSTOMER IDENTIFICATION AND WORKFLOW OPTIMIZATION

CROSS-REFERENCE TO RELATED APPLICATIONS

This application claims the benefit of priority on U.S. Provisional Application No. 62/953,402 filed Dec. 24, 2019, the entire contents of which are incorporated by reference herein.

FIELD

Embodiments of the disclosure relate to the field of customer management. More specifically, certain embodiments of the disclosure relate to a system, apparatus and method for automatically identifying customers and generating customer workflows.

BACKGROUND

Many businesses today operate in a "vertical market" in which goods and services specific to a particular industry, trade, or profession are offered to customers with specialized needs (e.g., medical or dental offices, automobile dealerships, etc.). The activities of vertical market businesses often involve similar problems and aims to solving those problems. As a result, various venders have attempted to provide goods and services tailored to business within specific vertical markets that focus on particular concerns and challenges unique to that market.

Although competition within each vertical market is often within a well-defined portion of the overall market, the overlapping functions of products and services offered by vertical market businesses lead to a highly competitive environment. As a result, products and services from external vendors often cater to the needs of specific vertical markets in order to provide competitive advantages. Many such goods and services can relate to generating better customer engagement.

A vertical market business may only have a few interactions with a customer per year. In some businesses, the majority of customer interactions involve phone calls placed by the customer to the vertical market business. Therefore, there is often a desire to increase customer engagement with the vertical market business during such calls. Engagement can include increasing a customer's satisfaction when contacting or interacting with the company. This may be achieved through more customized or personal interactions, as well as providing a sense of knowledge about the customer and their past services provided by the vertical market business.

However, it can often be difficult to achieve increased levels of customer engagement during interactions within certain vertical markets. This may be due to the vertical market business having a large number of customers who cannot be manually tracked or when there are very few times to talk with a customer between interactions/transactions. For these vertical market businesses, increased customer engagement may be more difficult to provide without additional tools.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

The following description is not to be taken in a limiting sense but is made merely for the purpose of describing the general principles of exemplary embodiments. The scope of the disclosure should be determined with reference to the claims. Reference throughout this specification to "one embodiment," "an embodiment," or similar language means that a particular feature, structure, or characteristic that is described in connection with the referenced embodiment is included in at least the referenced embodiment. Likewise, reference throughout this specification to "some embodiments" or similar language means that particular features, structures, or characteristics that are described in connection with the referenced embodiments are included in at least the referenced embodiments. Thus, appearances of the phrases "in one embodiment," "in an embodiment," "in some embodiments," and similar language throughout this specification can, but do not necessarily, all refer to the same embodiment.

Further, the described features, structures, or characteristics of the present disclosure can be combined in any suitable manner in one or more embodiments. In the description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure.

In the following description, certain terminology is used to describe features of the invention. For example, in certain situations, the terms "logic" and "engine" are representative of hardware, firmware and/or software that is configured to perform one or more functions. As hardware, logic (or engine) may include circuitry having data processing and/or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

Logic (or engine) may be software in the form of one or more software modules, such as executable code in the form of an application, an application programming interface (API), a subroutine, a function, a procedure, an applet, a servlet, a routine, source code, object code, a shared library/dynamic link library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage mediums may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "workflow" herein refers to a series of interactions between a customer and a vertical market business. Each interaction may be classified as an event and each workflow may comprise any number of events. Events within a workflow may be associated with interactions the vertical market business initiates with the customer or vice versa. Often, workflows can be generated to inform the vertical market business efficiently interacting with the customer. Workflows may be generated as a report that is produced periodically or aperiodically for the vertical market business to act on; or workflows may be generated in real-time or near real-time in response to a customer initiating an interaction with the vertical market business, including a phone call or walk-in appointment.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

In response to the problems discussed above, embodiments of the present disclosure provide for increased customer engagement in vertical market businesses by automatically providing customer identifications and optimizing customer workflows via a series of events. This is achieved through the use of a caller identification router communicatively coupled to the incoming telephone lines of a vertical market business, which may extract and transmit caller identification data to a customer relationship management system to perform customer analytics. The customer analytics may identify an incoming call as likely belonging to a particular customer, and then transmit that data, along with any other customer-specific information (e.g., customer account receivables, personalized script to interact with customer, etc.) to a computing device operated by an employee at the vertical market business prior to or concurrently with answering the call. Virtual assistant logic may be loaded onto the computing device to display customer identification data and/or customer-specific information on a virtual assistant display. The customer-specific information may be used to show the employee any further customer interaction events within a customer workflow that may be received from the customer relationship management system.

In order to generate a match between an incoming call and a customer record within a particular vertical market business's records, the customer relationship management system may require knowledge of what specific business is requesting a customer match. In many embodiments, the caller identification router may have an identifier embedded within a memory which can be provided along with the extracted caller identification data to the customer relationship management system. The customer relationship management system is configured to determine a particular customer record with a particular company. The system can be configured to operate in real time or near real time such that the identification and display of the customer name and personalized greeting can be provided to the virtual assistant display prior to the vertical market business employee answering the telephone call.

The customer relationship management system may also have further data associated with the customer that can be utilized to create subsequent events within the customer interaction workflow. For instance, certain customers may desire prior notification of upcoming appointments that allows the customer to confirm or reschedule the appointment, notification of any "past due" invoices from the business, or that based on previous purchases, the customer may now be interested in a supplemental product and/or service. Each of these events may be utilized by the customer analytics tools to generate additional event data that can be provided as an overall customer workflow to the employee of the vertical market business. An organized, customer workflow can provide a more efficient interaction with a customer, which can lead to increased customer satisfaction as the need for subsequent calls or interactions can be eliminated, saving customers time and streamlining company goals. The use of customer-specific when answering phone calls may also increase customer engagement as certain customers may feel a more personal connection with the vertical market business.

Customer workflows may also be generated periodically and not necessarily in response to an incoming customer call. In certain embodiments, the customer relationship management system may generate and transmit one or more reports to practice management software hosted on an on-premises server of the vertical market business. In further embodiments, reports may be generated by the customer relationship management system and be subsequently accessible through a web browser or other remote access means. These reports comprise generated customer workflows which may include, for example, calling customers to confirm appointments, and/or reminding customers of unpaid account balances. Further embodiments of the invention described herein allow for the caller identification router to provide communications abilities between a customer and a kiosk display (also known as a virtual assistant) to provide an interactive experience between the customer and the vertical market business when, for example, the customer comes into the vertical market business to check in for an appointment.

As can be recognized by those skilled in the art, the methods and systems described herein are applicable to various vertical market businesses such as, but not limited to, doctor's offices, dentist offices, automobile dealerships, vehicle repair centers, banking, and/or insurance businesses. The systems described herein may include purchasing and installing the caller identification box into an existing system to add functionality related to automatically generating customer identifications and optimizing customer workflows. The caller identification router may be provided by one vender to be installed within another vendor's customer relationship management software and/or practice management system. However, the customer identification and workflow optimization system may be installed entirely as a self-contained system depending on the desired application.

Figure 1A:
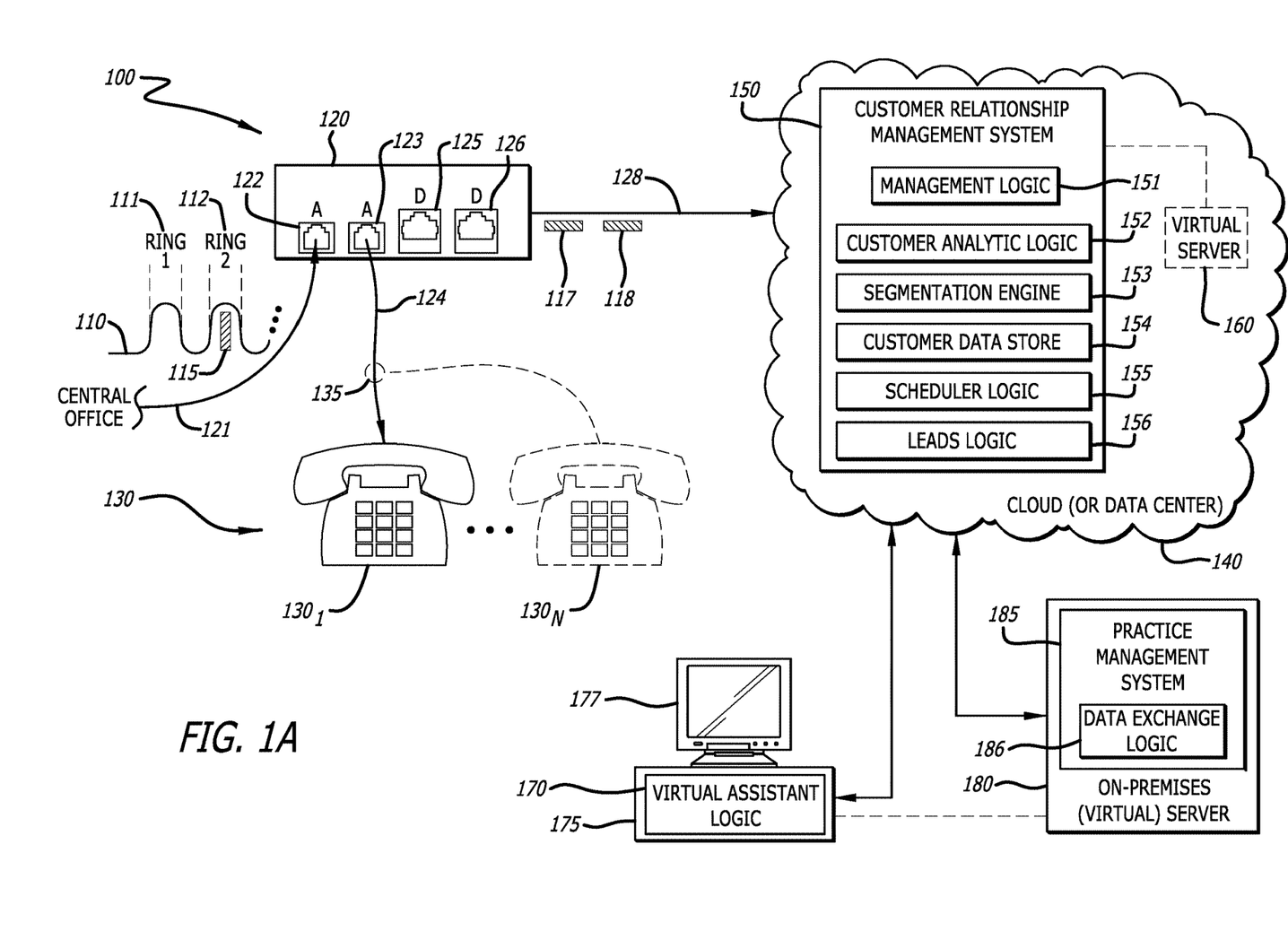
FIG. 1A depicts an exemplary system diagram of a customer identification and workflow optimization system utilizing traditional telephone lines in accordance with various embodiments of the invention.

Referring to FIG. 1A, a system diagram of a customer identification and workflow optimization system 100 utilizing traditional telephone lines in accordance with various embodiments of the invention is shown. Herein, the customer identification and workflow optimization system 100 features a caller identification router 120 and a virtual assistant logic 170 deployed at a vertical market business along with a customer relationship management system 150 deployed remotely from the vertical market business. For example, the customer relationship management system 150 may be deployed within a cloud or data center 140 (e.g., a public cloud network, a private cloud network, etc.), such as a cloud service offered by a public cloud network. Additionally, a server 180 including a practice management system 185, that is configured to maintain information associated with customers of the vertical market business, including customer information, account receivable (AR) balances, consumer appointments, additional treatment or the like, may be deployed as a physical server (e.g., on-premises, remote but accessible to the customer relationship management system, etc.).

As shown in FIG. 1A, the caller identification router 120 is configured to conduct customer identification for a caller initiating a telephone call to the virtual market business. More specifically, the caller identification router 120 is configured to (i) extract caller identification (also known more broadly as "caller ID") information from a telephone call signal 110 and (ii) pass information, included the extracted caller ID data, to the cloud or data center 140 for processing. As shown, the telephone call signal 110 corresponds to an analog telephone signal that is received by an analog telephone system 130 deployed by the virtual market business.

For instance, according to this embodiment of the disclosure, the caller identification router 120 may include a telephone input port 122 (e.g., Plain Old Telephone Service "POTS" connector), which is adapted for communicative coupling to an incoming telephone line 121. When the telephone line 121 is coupled to the telephone input port 122, the caller identification router 120 is configured to receive the telephone call signal 110 propagating over the incoming telephone line 121. The caller identification router 120 includes caller identification logic (not shown), which extracts embedded caller ID data 115 before passing the telephone call signal 110 through an outgoing telephone line 124 to the analog telephone system 130.

According to one embodiment, the analog telephone system 130 includes a first analog phone $130_1$ coupled to the outgoing telephone line 124 to provide a means for answering the call. In other embodiments, an analog telephone line splitter 135 may be installed on the outgoing telephone line 124 so as to enable the analog telephone system 130 to support multiple analog telephones $130_1$-$130_N$ (N>1). It is contemplated that any number of analog telephones $130_1$-$130_N$ can be utilized in the customer identification and workflow optimization system 100 based on the desired application.

Often, the "analog" telephone call signal 110 constitutes an analog data stream including the caller ID data embedded (e.g., using signal modulation) between a plurality of rings 111, 112 repeated until the phone call is answered (off-hook). In some incoming calls, embedded caller ID data 115 may be available in a particular ring, such as by the second ring 112 via traditional caller identification means. The caller identification router 120 is configured to recognize and extract the embedded caller ID data 115. Upon receipt of the embedded caller ID data 115, the caller identification router 120 can parse the embedded caller ID data 115 to obtain caller identification data 117 and transmit the caller identification data 117 across a wired or wireless communication connection 128 to a customer relationship management system 150 hosted on the cloud and/or data center 140. As an alternative embodiment, although not shown, it is contemplated that the wired or wireless communication connection 128 may be configured to establish a coupling with the on-premises server 180 which may then relay the caller identification data 117 to the cloud and/or data center 140.

Additionally, the caller identification router 120 can comprise router identification data 118 to identify a particular vertical market business or an owner of the caller identification router 120. In a variety of embodiments, the router identification data 118 may be a data sequence substantially unique to the router 120, such as an identifier assigned to the caller identification router 120 or an identifier assigned to a component implemented within the caller identification router 120 (e.g., processor identifier). Alternatively, the router identification data 118 may be stored on a non-volatile memory within the caller identification router 120.

As shown in FIG. 1A, the caller identification router 120 transmits both the caller identification data 117 and the router identification data 118 across the wireless connection 128 upon receiving a call. As discussed in more detail below, the caller identification data 117 and the router identification data 118 can be utilized to generate (or recover) customer identification data which can eventually be provided to the virtual assistant logic 170 operating within a computing device 175 (e.g., desktop computer, a laptop computer, netbook, electronic tablet, etc.) and displayed on a display screen 177, which may be a separate peripheral (as shown) or integrated as part of the computing device 175. Further embodiments regarding the contents and structure of the caller identification router 120 can be found below in the discussion of FIG. 3.

When transferred to the customer relationship management system 150, the received caller identification data 117 and the router identification data 118 may be processed by logic within the customer relationship management system 150 to generate (or recover) data associated with a particular customer. In the embodiment as depicted in FIG. 1A, the logic may include, but is not limited to, management logic 151, customer analytic logic 152, segmentation engine 153, a customer data store 154, scheduler logic 155, and a leads logic 156. As those skilled in the art will recognize, any combination or arrangement of logic may be utilized based on the application desired. For example, certain logic may reside within the caller identification router 120, or may be combined, or outsourced to other processing services, including another cloud network and/or data center 140.

In various embodiments, the management logic 151 facilitates the transfer of data between the customer relationship management system 150 and the caller identification router 120, the on-premises server 180, and virtual assistant logic 170. Transfers may be facilitated wirelessly over a number of platforms such as Wi-Fi®, Bluetooth®, and/or radio frequency identification (RFID). Data transfer can occur over the Internet or within a local network. In certain embodiments, communication can occur via a physical connection such as, but not limited to, a universal serial bus (USB), a network connection (e.g., Ethernet, etc.), and/or analog telephone connection. In some embodiments, the management logic 151 includes a database (or has access to a data store) of existing vertical market businesses that utilize caller identification routers 120 along with router identification data 118 associated with each vertical market business. In this way, the management logic 151 may receive router identification data 118 and subsequently identify which caller identification router 120 sent the caller identification data 117, which can then be utilized to identify the vertical market business customer associated with the caller identification data 118. The customer relationship management system 150 may then generate a workflow configured for the customer associated with the incoming call.

Customer analytic logic 152 can process available data sources to generate event data associated with the identified customer which may then be utilized to generate the customer workflow. In many embodiments, the generation of event data can occur by accessing the received caller identification data 117, and router identification data 118, along with stored customer data within the customer data store 154 of the customer relationship management system 150. In further embodiments, the customer analytic logic 152 may be configured to access (i) customer data within the customer data store 154, (ii) schedule data within the scheduler logic 155, and/or (iii) lead data from the leads logic 156.

Event data may represent a variety of interactions between the vertical market business and customers. Events can include, but are not limited to, providing customized customer greetings, reminders for current and/or past due payments, reminders for scheduling and/or confirming upcoming appointments, customer notifications of products and/or services of previous interest by the customer, prompts for upselling customer-specific products and/or services, projections for future purchases, and/or suggestions based on customer reviews. Any combination of events may be generated based on the specific customer and can be grouped together to generate a workflow for customer interaction.

In additional embodiments, the segmentation engine 153 may be configured to determine groupings of data to transmit to the virtual assistant logic 170 and/or practice management system 185 of the on-premises server 180. For example, the customer relationship management system 150 may be utilized by a vertical market business to provide personalized greetings to customers when they call. Determining the customized greeting events can often be quickly accomplished before the generation of other events. In a variety of embodiments, the segmentation engine 153 can generate a first grouping of data that comprises a customized greeting including the customer name and transmit that first grouping to the virtual assistant logic 170. This first grouping of data can be displayed on the display 177 and can be utilized to provide a customized greeting to the customer upon answering the telephone call. Subsequent to the transmission of the first grouping of event data, the segmentation engine 153 can generate and transmit additional groupings of event data as needed, where the second grouping of events may take a few seconds to verify that no recent updates to customer data have occurred (e.g., current AR balance, current appointment schedule, etc.).

In many embodiments, the customer data store 154 features data associated with a plurality of customers for each vertical market business. Customer data within the customer data store 154 may be utilized to generate events for a customer workflow. Customer data may include, but is not limited to, customer identification data (e.g., name, address, birthdate, social security number, identification number, etc.), records of past purchases and appointments, upcoming appointments, potential associated or future purchases, previous suggestions, rankings and ratings, social media data, etc. In some embodiments, the scheduler logic 155 and leads logic 156 utilize schedule data and leads data respectively which can be extracted from the customer data maintained in the customer data store 154. In other embodiments, scheduling and/or lead data may be stored within the scheduler logic 155 and/or leads logic 156, respectively.

In additional embodiments, scheduler logic 155 can generate events associated with a customer's schedule in relation to the vertical market business. In response to a customer call, the scheduler logic 155 can determine if an upcoming appointment should be scheduled and generate an event as a prompt to elicit a customer response. The prompt may be presented to the user on a virtual assistant kiosk or personal computing device, or as a script an employee of the vertical market business can read while interacting with the customer. The scheduler logic 155 can access a master calendar for the vertical market business which may provide available appointment times for scheduling future appointments. The scheduler logic 155 can be configured to receive requests for future appointments from a customer or employee of the vertical market business or to check a customer in for a current appointment which may then be stored within the customer data store 154 and/or scheduler logic 155.

In some embodiments, the scheduler logic 155 can generate scheduling reports that may be transmitted to the practice management system 185 and/or the virtual assistant logic 170. For example, the scheduler logic 155 can generate a daily report that lists all upcoming appointments for a particular vertical market business during a particular time period. Additionally, the scheduler logic 155 may recognize changes to the schedule which then create scheduling conflicts. As a result, events may be generated that can be transmitted to the practice management system 185 and or virtual assistant logic 170 to prompt an employee of the vertical market business to contact customers that may be affected by such scheduling conflicts.

In a variety of embodiments, the leads logic 156 may be utilized to capture external sources of data that can be configured to generate future sales leads. In one embodiment, the leads logic 156 can be configured to crawl social media feeds and identify users who have expressed an interest or potential interest in a product and/or service related to the vertical market business. For example, the leads logic 156 utilized in a dentist's office may be configured to search for public social media posts that ask questions related to teeth whitening services. When found, the leads logic 156 can attempt to extract all relevant contact data for the potential customer and generate an event for an employee of the vertical market business to contact that potential customer. In certain embodiments, the leads logic 156 may be configured to gain permission from current customers to search social media feeds of friends of the current customers in order to find potential customers who can be contacted. In further embodiments, the leads logic 156 may be configured to communicate with external lead generation systems that may provide lead data to the customer relationship management system 150. Received lead data can be utilized to generate events for employees of the vertical market business.

Often, a vertical market business may have an on-premises server 180 to facilitate operations within the business. The on-premises server 180 includes a practice management system 185 which can communicate with the customer relationship management system 150 via a data exchange logic 186. As those skilled in the art will recognize, the practice management system 185 can be utilized by the vertical market business for a variety of purposes, many of which may benefit from data received from the customer relationship management system 150. As discussed above, various reports may be generated by the customer relationship management system 150 and transmitted to the practice management system 185.

Data may also be generated throughout the day at the vertical market business, which is uploaded from the practice management system 185 to the customer relationship management system 150. In various embodiments, the data exchange logic 186 directs the uploading of data from the practice management system 185 in an aperiodic manner such as in real-time or near real-time. In other embodiments, the uploading of data may occur periodically (e.g., scheduled times throughout the day, daily, weekly, etc.). In still other embodiments, different types of data may be uploaded at different frequencies (e.g., scheduling data is uploaded at near real-time, but new customer data is uploaded daily, etc.).

It is contemplated that in some embodiments, the on-premises server 180 may operate as a virtual server 160. In these cases, functions of the practice management system 185 may be provided remotely from a physical location of the vertical market business. Although the virtual server 160 is depicted in FIG. 1A as existing within the same cloud network or data center 140 as the customer relationship management system 150, certain embodiments of the virtual server 160 can operate within a separate cloud network or data center.

Vertical market businesses may have one or more computing devices 175, each installed with virtual assistant logic 170 to assist in alerting customers and employees to events within a customer workflow. For example, the virtual assistant logic 170 may be installed within the computing device 175, where the virtual assistant logic 170 may process event data associated with the customer workflow for illustration on the display 177. This information may be viewed by employees and/or customers. The display 177 may comprise a display assigned to an employee of the vertical market business and displays event data as events for the employee to act on. In one example, a customer may place a telephone call to the vertical market business, causing the customer relationship management system 150 to transmit the customer's name and customized greeting for that particular customer such that it is automatically displayed on the display 177, which allows a vertical market business employee to answer the phone and personally greet the customer. Further events, such as scheduling reminders and/or bill payment reminders may also be shown on the display 177 for the employee to act on by, for example, reminding the customer over the phone and/or offering to take payment for any outstanding account receivables (ARs).

In further embodiments, the computing device 175 and display 177 may be positioned as a kiosk or customer-facing display that can interact directly with a customer during a visit. Given wireless connectivity, the caller identification router 120 may be configured to interact with a customer's portable computing device such that the presence of the customer can be detected. In these embodiments, the caller identification router 120 may generate signaling to the customer relationship management system 150, which prompts the virtual assistant logic 170 within the computing device 175 to generate and display customized greetings and/or prompts for the customer (e.g., request advanced co-payment or payment of ARs via a credit card reader located with the computing device 150, etc.).

Figure 6:
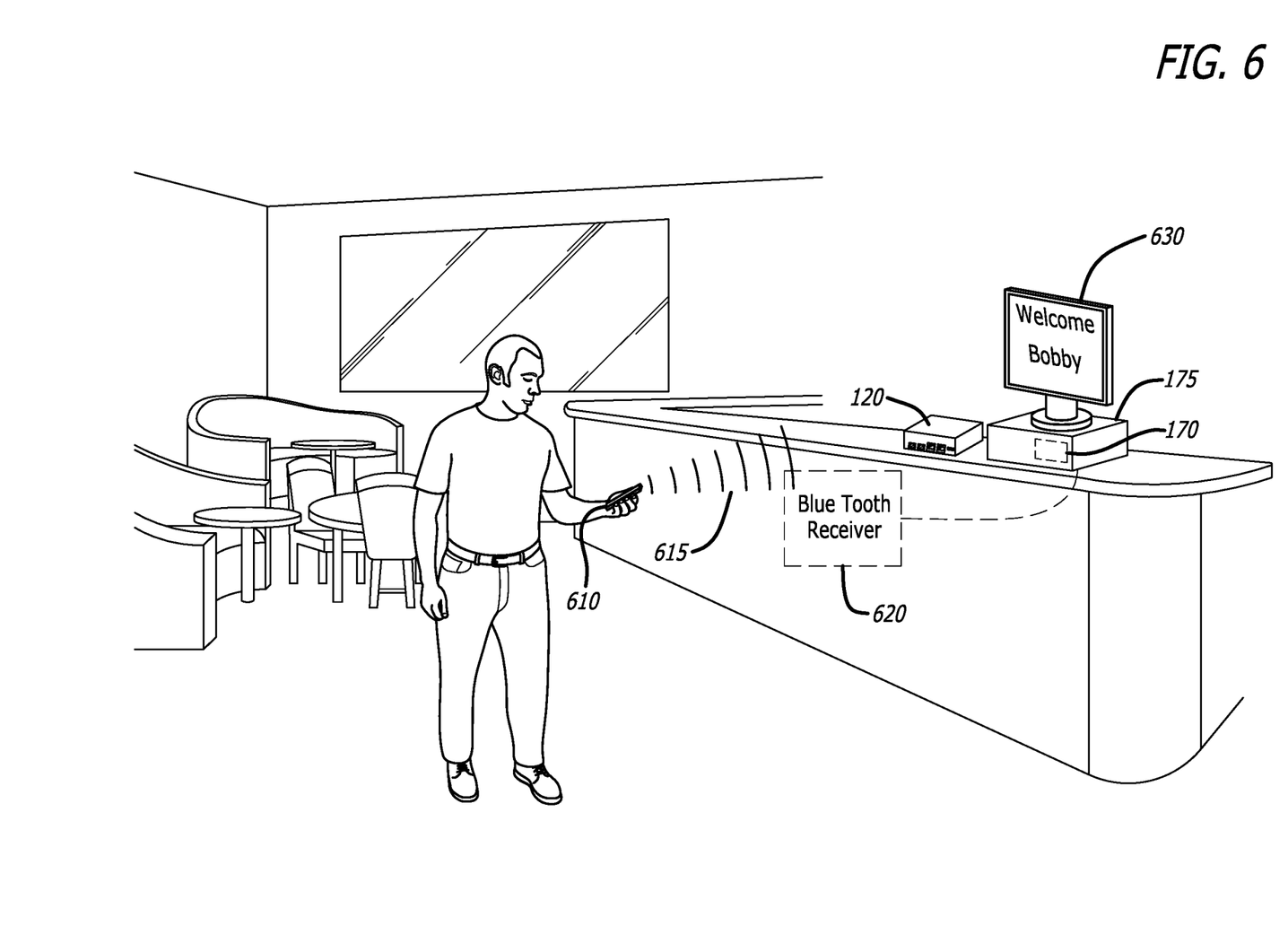
FIG. 6 depicts an exemplary event-triggered customer interaction with a virtual assistant in accordance with an embodiment of the invention.

Shown in more detail within the embodiments disclosed in the discussion of FIG. 6, a portable computing device for a customer (e.g., cell phone, smart watch, tablet, etc.) may install an application associated with the vertical market business and transmits a signal (via geo-location tracking triggering, or responsive to an initial signal) to the caller identification router 120 (or another input device), which transmits an identifier of the application installed on the portable computing device along with an identifier of the router (or another input device), similar to the caller identification data 117 and the router identification data 118 described above, to the customer relationship management system 150. Upon receipt of the application identifiers and the router (or input device) identifier, the customer relationship management system 150 recovers and generates event data for the customer workflow for rendering on the display 177. Events may include, but are not limited to, personalized greetings, appointment check-in prompts, product/service menu display and selection, and/or stored payment/insurance verification. Hence, for this deployment, in lieu of an incoming telephone call, a response to discovery of the Bluetooth®-enabled phone by the customer prompts a download of identification data to generate interactive displays for that specific customer.

Referring back to FIG. 1A, it is contemplated that certain embodiments may provide for the virtual assistant logic 170 to be located within the on-premises server 180 or virtual server 160. The virtual assistant logic 170 may, in some embodiments, be implemented within the customer relationship management system 150 within the cloud network or data center 140, and that the display 177 provides logic sufficient to receive and display event data and/or pre-rendered events.

As an illustrative example of the customer identification and workflow optimization system 100 of FIG. 1A, an existing customer may call into a vertical market business wherein the call contains the embedded caller ID data 115 which is read and parsed by the caller identification router 120. The caller identification router 120 transmits the caller identification data 117 along with router identifier data 118 associated with the specific caller identification router 120 to the customer relationship system 150 via a wireless connection 128 through the Internet. The management logic 151 of the customer relationship management system 150 receives the router identifier data 118 and determines which vertical market business is requesting the event and/or workflow data. The caller identification data 117 is utilized to look up within the customer data store 154 which specific customer is calling. When located, the customer analytic logic 152 can generate a customized greeting for the customer and the segmentation engine 153 may then generate an initial personalized greeting event as a first grouping of data to transmit to a virtual assistant logic 170 which then displays the customized greeting on the display 177. The personalized greeting event is displayed to be read and utilized by an employee of the vertical market business when answering the customer call. The customer analytic logic 151 may then determine that the identified customer has a past due account and generate another event which can then be packaged by the segmentation logic as a second grouping of data that is sent to the virtual assistant logic 170 for display to the employee, thus prompting the employee to remind the customer that they can accept payment for the past due account over the phone.

During the same call, the customer may provide new payment information and updated address data. The employee of the vertical market business can accept and input that data into the practice management system 185. Subsequently, at the end of the business day, the data exchange logic 186 within the practice management system 185 transmits the customer's new payment information and address data to the customer data store 154 within the customer relationship management system 150 for future use.

Figure 1B:
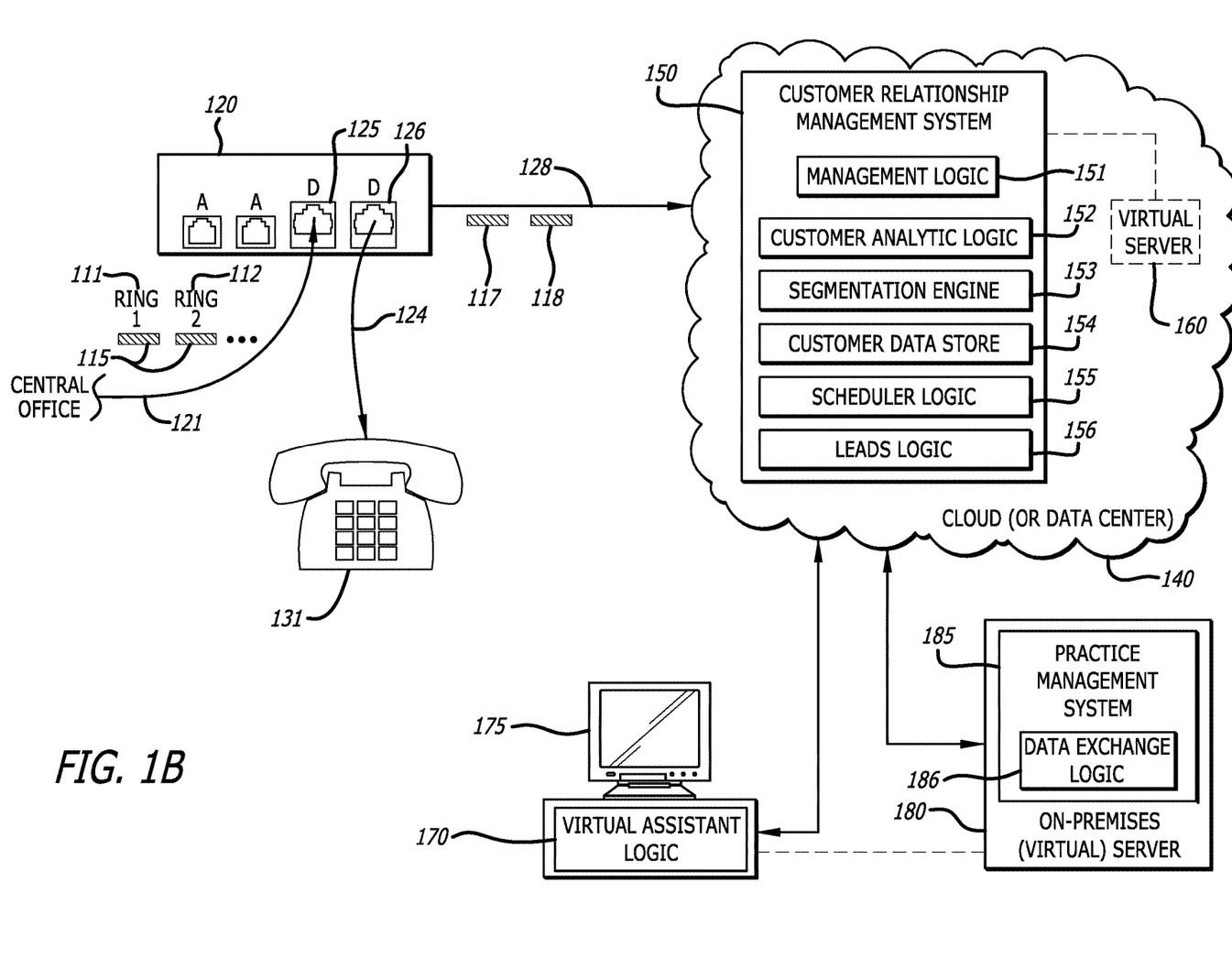
FIG. 1B depicts an exemplary system diagram of a customer identification and workflow optimization system utilizing broadband telephone lines in accordance with various embodiments of the invention.

Referring now to FIG. 1B, a system diagram of a customer identification and workflow optimization system 100 utilizing broadband telephone lines in accordance with various embodiments of the invention is shown. Similar to platform organization as shown in FIG. 1A, the customer identification and workflow optimization system 100 features the caller identification router 120 and the virtual assistant logic 170 deployed at a vertical market business along with the customer relationship management system 150 deployed remotely from the vertical market business. The server 180 including the practice management system 185, configured to maintain information associated with customers of the vertical market business is also may be deployed as a physical server.

However, in embodiments depicted with respect to FIG. 1B, the customer identification and workflow optimization system 100 may utilize a broadband phone 131 instead of the analog telephone(s) 130$_1$-130$_N$ of FIG. 1A. In many respects, the use of broadband phones 131 are identical to analog telephones 130$_1$-130$_N$; however, as is understood by those skilled in the art, each outgoing telephone line 124 may only be utilized by a single broadband phone 131 since analog telephone line splitters (or any line splitters) are not compatible with typical broadband phones 131.

For example, according to this embodiment of the disclosure, the caller identification router 120 includes an incoming Ethernet port 125, which is adapted to receive a network communication line operating as the incoming telephone line 121. When the telephone line 121 is coupled to the incoming Ethernet port 125, the caller identification router 120 is configured to receive the caller ID data 115 embedded within packetized data. Caller identification logic (not shown) within the caller identification router 120 extracts the embedded caller ID data 115 before passing the telephone call through an outgoing Ethernet port 126 to the broadband phone 131 over an outgoing telephone line 124.

In other respects, the remaining components of FIG. 1B function similarly to their counterparts depicted in FIG. 1A. The caller identification router 120 extracts and transmits the caller identification data 117 and router identification data 118 associated with the caller identification router 120 to the customer relationship management system 150 which may then generate events and customer workflows for transmission to a virtual assistant logic 170 and/or practice management system 185.

Figure 2A:
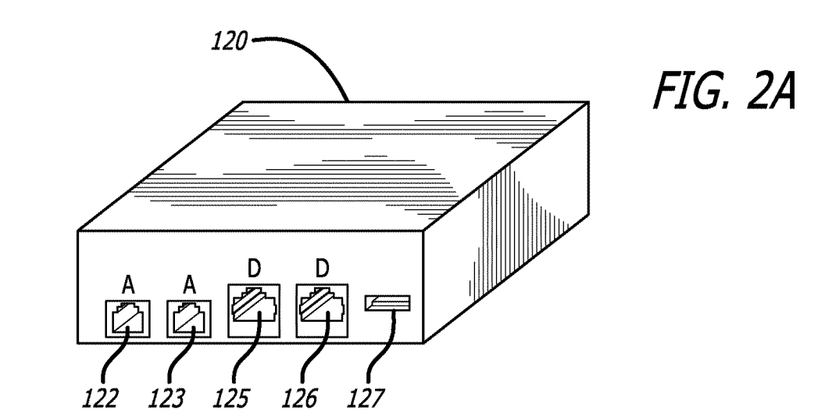
FIG. 2A depicts an exemplary caller identification routing device (router) within a customer identification and workflow optimization system in accordance with an embodiment of the invention.

Referring to FIG. 2A, an exemplary caller identification (ID) router 120 within a customer identification and workflow optimization system 100 in accordance with an embodiment of the invention is shown. A caller identification router 120 may be implemented as a rectangular cuboid electronic device with a plurality of ports and internal processing and communication circuits to provide functionality. In various embodiments, the caller identification router 120 may have input and output ports (sometimes referred to as "connectors") 122, 123, 125, 126 configured for receiving and passing-through analog and/or digital telephone signals.

In some embodiments, the caller identification router 120 is configured with connectors to support connectivity to either an analog telephone system or a digital telephone system. As shown, the caller identification router 120 includes the telephone input port 122 to accept an analog telephone call signal as input, where the embedded caller ID data 115 is extracted (FIG. 1A) and the analog telephone call signal is passed via the telephone output port 123 for reception by one or more analog telephones. Conversely, the caller identification router 120 may utilize an incoming Ethernet port 125 to receive a broadband telephone signal for extraction and processing of embedded caller ID data 115 (FIG. 1B), which is subsequently passed through the outgoing Ethernet port 126 to a broadband phone 131 for answering.

In certain embodiments, a universal serial bus (USB) port 127 may be provided to receive power for the caller identification router 120, although a standard barrel power socket or other interface may be utilized to provide power in lieu of a USB port. In still further embodiments, the USB port 127 may be configured to provide an interface to receive software-based updates to the internal processors and/or chipsets, especially when the caller identification router 120 is configured with an internal battery 350 (FIG. 3), which may provide power for the device without the need for external power (except for recharging). Finally, power may be provided to the caller identification router 120 through alternate standards including, but not limited to, power over Ethernet (PoE). Further discussion of the structure of the caller identification router 120 is provided below in FIG. 2B, while discussion of the general components of the caller identification router 120 is provided in FIG. 3 below.

Figure 2B:
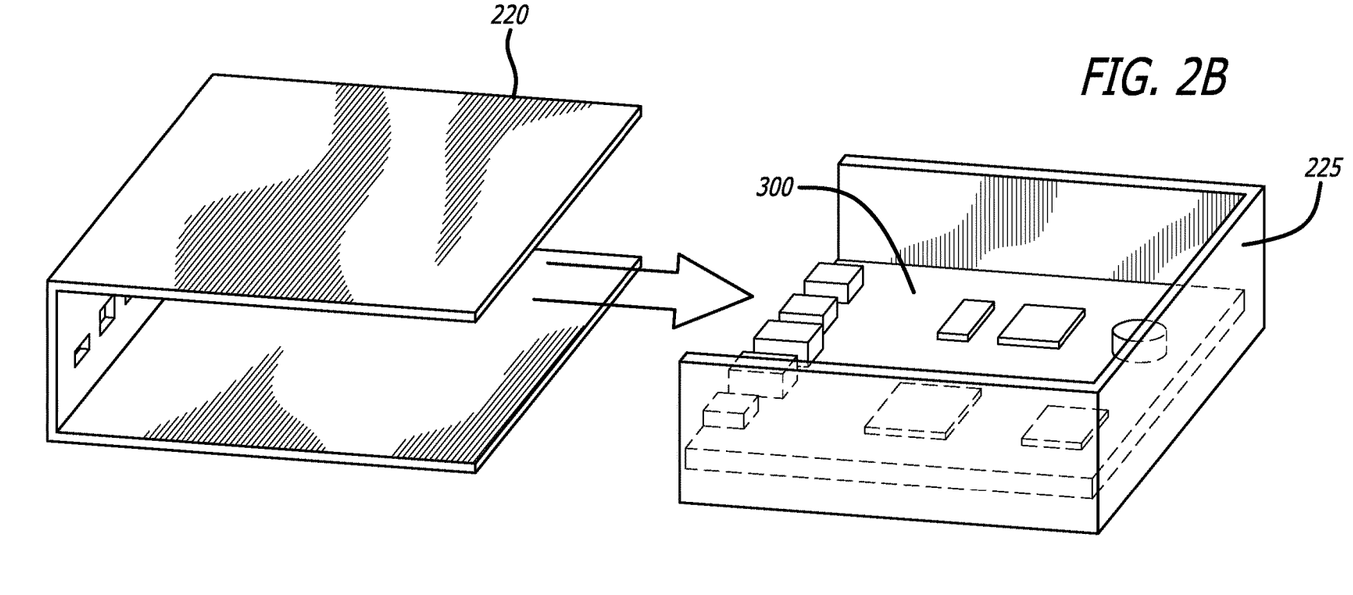
FIG. 2B depicts an exemplary exploded view of a caller identification router within a customer identification and workflow optimization system in accordance with an embodiment of the invention.

Referring to FIG. 2B, an exemplary exploded view of an embodiment of the caller identification router 120 deployed within the customer identification and workflow optimization is shown. It can be appreciated that various methods may be used to construct a caller identification router 120 including the method of the embodiment depicted herein. The caller identification router 120 comprises a main board 300 which may be configured to reside within a first enclosure portion 225. The first enclosure portion 225 comprises three adjacent sides, each side disposed at approximately ninety-degree angles to each other, with two of the three sides opposing each other. The two opposing sides of the first enclosure portion 225 can include indented slot portions which can be configured to couple with the main board 300 such that the main board 300 may slide into both slots and be held in place within the first enclosure portion 225.

Once situated into the first enclosure portion 225, the main board 300 may be enveloped (i.e., surrounded) by a second enclosure portion 220 that couples with the first enclosure portion 225. The second enclosure portion 220 can also have three adjacent sides at approximately ninety-degree angles relative to each other, with two opposing sides and one non-opposing side. Depending on the configuration of the main board 300, a front-facing (non-opposing) side of the second enclosure portion 220 may have a plurality of openings configured to provide access to the plurality of communication ports 122-123 and 125-127 (FIG. 2A) positioned along a front edge of the main board 300.

When the first enclosure portion 225 and second enclosure portion 220 are slidably engaged to create the complete enclosure of the caller identification router 120, the main board 300 is positioned entirely within the completed enclosure. In a variety of embodiments, each side of the enclosure is rectangular in shape and each of the first and second enclosure portions 225, 220 feature three of the six sides of a rectangular cuboid forming a housing of the caller identification router 120.

Figure 3:
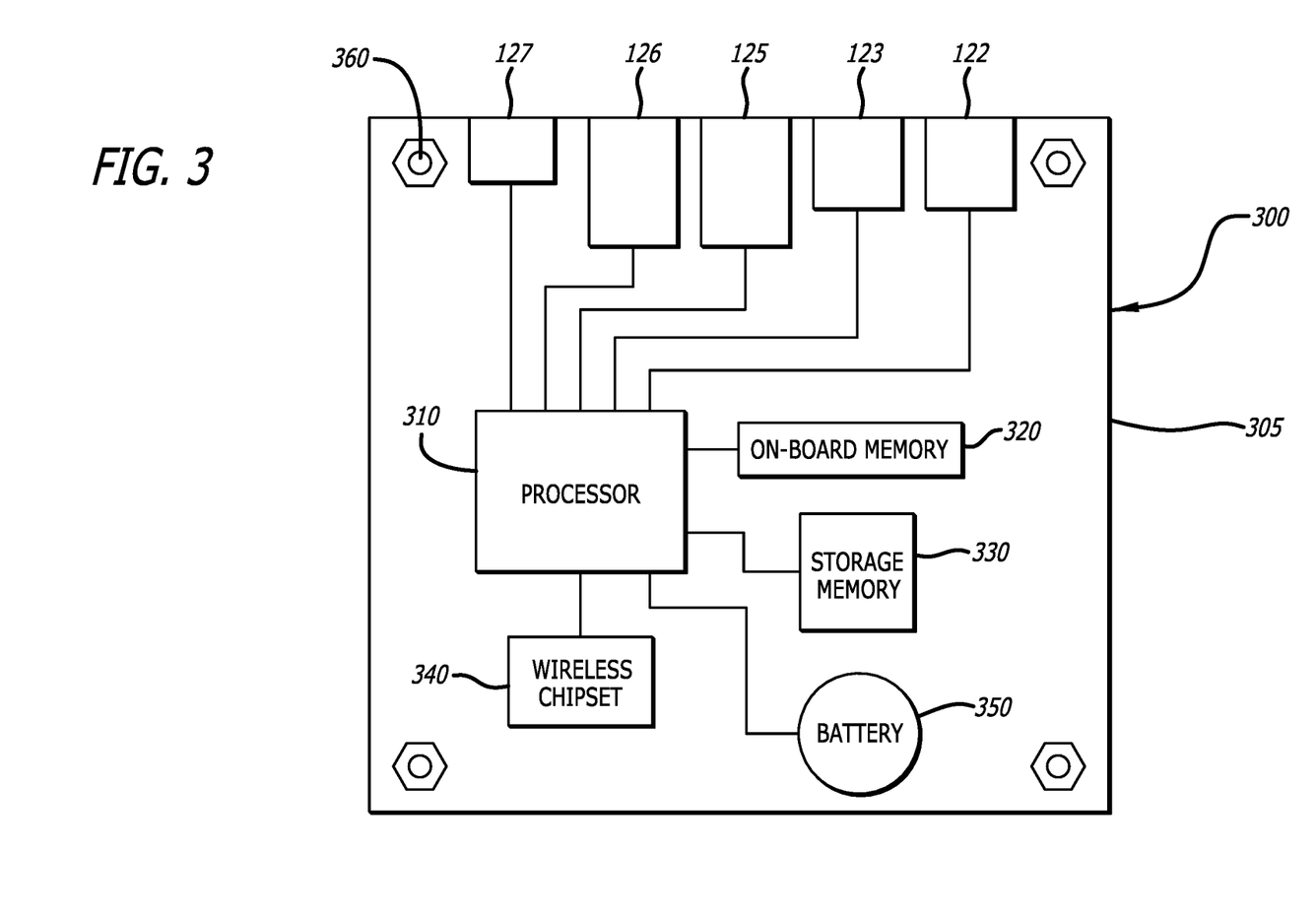
FIG. 3 depicts an exemplary hardware block diagram of a caller identification router in accordance with an embodiment of the invention.

Referring to FIG. 3, an exemplary hardware block diagram of the main board 300 of the caller identification router 120 in accordance with an embodiment of the invention is shown. For this embodiment, the main board 300 installed within the caller identification router 120 includes a printed circuit board 305 with a plurality of installed components mounted thereon. These components may include a processor 310 in communication with incoming and outgoing analog telephone ports (connectors) 122, 123, Ethernet ports (connectors) 125, 126, and universal serial bus (USB) port (connector) 127. The processor 310 may also be in communication with an on-board memory 320, a storage memory 330, a wireless chipset 340, and a battery 350, which are mounted on the printed circuit board 305. In some embodiments, the on-board memory 320 is correspond to a volatile memory (e.g., random-access memory "RAM") while the storage memory 330 may correspond to a non-volatile memory to provide longer-term storage of data. In certain embodiments, the processor 310 may also have an internal cache memory or non-volatile memory for storing basic input/output system (BIOS) data and/or router identification data 118 associated with the specific processor 310. In other embodiments, the router identification data 118 may be stored within the storage memory 330.

According to one embodiment of the disclosure, the main board 300 includes the wireless chipset 340, which is configured to facilitate wireless communications with external computing devices. Wireless communications may include, but are not limited to Wi-Fi®, Bluetooth®, and/or radio frequency identification (RFID). The selection of which wireless formats to transmit data may be selected based on the available signals and/or connections. Additionally, multiple wireless protocols may be utilized simultaneously based on the application desired. For example, the wireless chipset 340 may transmit and receive Bluetooth® signals between the caller identification router 120 and a customer's cellular phone when the customer is in close proximity to the caller identification router 120. After (or during) the period of the wireless chipset 340 transmitting and receiving signals from at least one customer via Bluetooth® signals, the wireless chipset 340 may also commence transmission and reception of Wi-Fi® signals with a network access point to provide access to the customer relationship management system 150.

In further embodiments, the battery 350 may be installed on the main board 300 which can provide power for the components of the caller identification router 120. In certain embodiments, the battery 350 may be configured to provide a secondary (i.e., failsafe) power supply to the processor 310 during software updates to verify that a loss of power will not occur. The failsafe power supply may also be utilized to avoid prematurely shutting down the caller identification router 120 before a proper power down procedure has occurred within the device. Alternatively, the main board 300 may be designed with low-power components such that a sufficient battery 350 may be provided that facilitates operation of the caller identification router 120 without the need for an external power supply for a prescribed duration.

In some embodiments, the battery 350 may be able to recharge from power reclaimed from external power sources including external power supplies or power provided from installed Ethernet cables via the power over Ethernet (PoE) standard.

The main board 300 may also be configured with a plurality of through holes that can be utilized to affix the main board 300 into an enclosure. It would be understood by those skilled in the art that the through holes and/or components of the main board 300 may be combined, moved, or otherwise altered from the embodiment depicted in FIG. 3, depending on the application desired. Also, the main board 300 may include a connection pin 360, which completes an electrical circuit when the housing is unopened (e.g., first enclosure portion 225 affixed to the second enclosure portion 220) to allow components of the main board to be powered. The connection pin 360 provides additional security to prevent unauthorized access to stored data within the on-board memory 320 or the storage memory 330.

Figure 4:
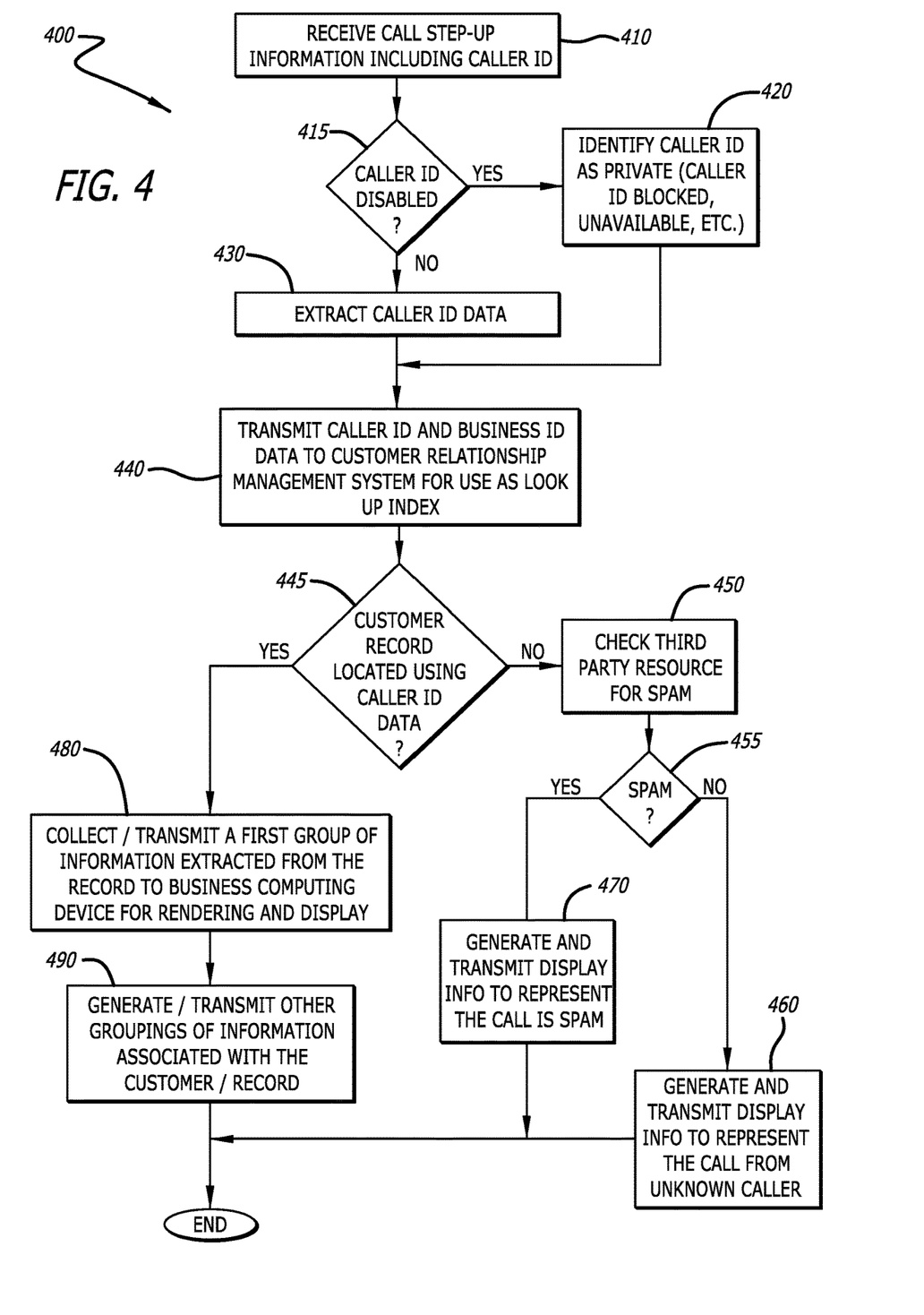
FIG. 4 is an exemplary flowchart of the process of automatically identifying customers and managing customer data.

Referring to FIG. 4, an exemplary flowchart of the process of automatically identifying customers and managing customer data is shown. The process 400 begins when a call is received, and the call signal includes information including embedded caller identification data (block 410). As described above, the call signal may have caller identification (ID) data embedded in differing formats based on whether analog and/or broadband phone systems are being utilized. The process 400 may determine if caller ID has been disabled (block 415). Disabled caller ID may include explicit disabling of the caller ID or the inability to extract caller ID data from the call signal (block 420). In many embodiments, this determination occurs within the caller identification router 120. When caller ID is determined to be available, the caller ID data is extracted (block 430).

Upon extraction of the caller ID data, the caller ID data as well as business ID data (i.e., router identification data) may be transmitted from the caller identification router to the customer relationship management system 150 for use as a look up index (block 445). In certain embodiments the management logic 151 of the customer relationship management system 150 facilitates the data reception and identification. The process 400 can attempt to determine if a customer record can be found within the customer relationship management system 150 based on the caller ID data received from the caller identification router 120 (block 445). In instances where no customer records can be located, the process 400 can check external third-party resources in an attempt to determine if the received call is likely a spam call (block 450). In many embodiments, the determination of whether the received call is spam, is facilitated by the management logic 151 of the customer relationship management system 150 shown in FIG. 1A (block 455). Upon determining that the unknown received call is not likely to be a spam call, the customer relationship management system 150 can generate and transmit display information identifying known information associate with the call such as telephone number, location of call and prompts to ask for identification as to whether this is a new phone number to contact a current customer (block 460). In instances where the unknown call is determined to likely be spam, the process 400 can generate and transmit display information that represents the call is likely to be spam (block 470).

The process may also determine that customer records can be found within the customer relationship management system 150 and may thus collect and transmit a first group of information (i.e., data) from the customer record to the registered computing device of the vertical market business for rendering and eventual display (block 480). In a variety of embodiments, the first grouping of data can include the likely name of the person calling as well as a customized greeting. Subsequent to the generation and transmission of the first grouping of information, the process 400 may generate and transmit other groupings of data including a second grouping of data comprising event data related to an overall workflow of a customer (block 490).

Figure 5:
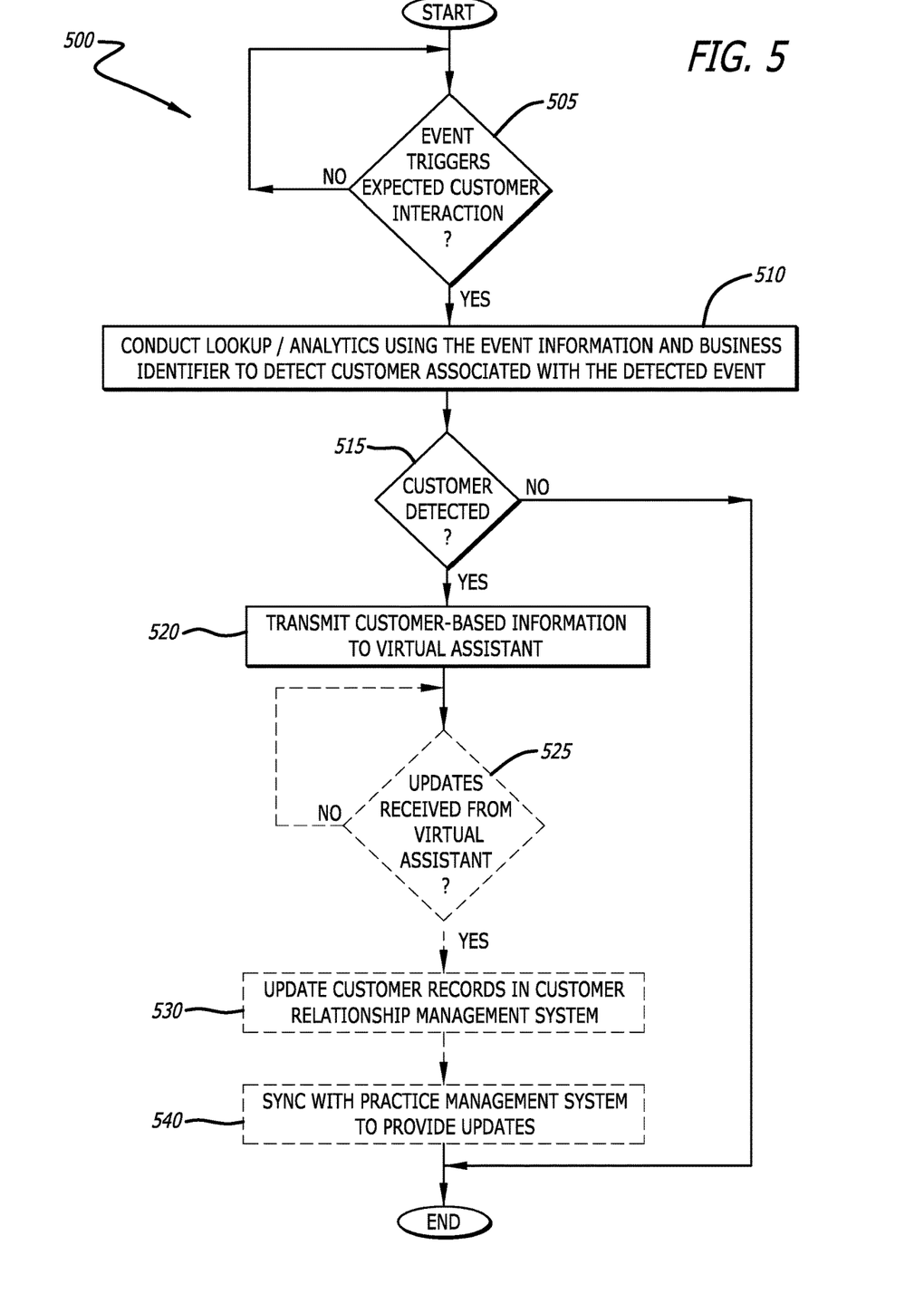
FIG. 5 is an exemplary flowchart of the process of optimizing workflows based on event-triggered customer interactions.

Referring to FIG. 5, an exemplary flowchart of the process of optimizing workflows based on event-triggered customer interactions is shown. The process 500 can begin by determining if a particular event has triggered an expected customer interaction (block 505). The process 500 repeats this determination until the expected customer interaction is triggered. For example, a customer may be expected to enter into the vertical market business and check-in for an appointment. The process 500 thus expects the customer at a particular time and may start the process once the event (appointment check-in) is triggered by the customer logging into a check-in kiosk or mobile phone application.

Once triggered, the process 500 may conduct a customer lookup and/or perform customer analytics using the expected event data along with the business identifier data (i.e., router identification data) to detect that the customer is correctly associated with the expected event (block 510). Upon retrieval of the data associated with the expected customer of the triggered event, the process 500 can determine if the correct customer was detected (block 515). If the customer associated with the expected event was not detected, then the process 500 can end. When the correct customer is detected, the information associated with the customer is transmitted to the virtual assistant (block 520). In certain embodiments, the transmitted customer data can be utilized to display a customized greeting to the customer upon check-in, allowing for the process 500 to end. However, in other embodiments, the process 500 may provide a means for receiving updated data from the virtual assistant by way of the customer entering in updated data (block 525).

In these embodiments, the process 500 may repeatedly determine updates were received from the virtual assistant. When the process 500 determines that updated data has been received from the virtual assistant, the corresponding customer records relating to that customer are updated within the customer relationship management system 150 (block 530). While the customer records may have been updated within the customer relationship management system 150, the process 500 can subsequently sync the updated customer records with the practice management system 180 (block 540). In this way for example, updated customer records provided by the customer at a kiosk station may promulgate throughout the systems of the vertical market business.

Referring to FIG. 6, an exemplary event-triggered customer interaction with a virtual assistant in accordance with an embodiment of the invention is shown. The example depicted in FIG. 6 may be illustrative of the process described in FIG. 5, although those skilled in the art will recognize that the process described in FIG. 5 can be utilized in more applications than the depiction illustrated with respect to FIG. 6.

A customer may enter into a vertical market business with a portable computing device such as a cellular phone 610. The cellular phone 610 can include an installed application that is configured for checking in the user and/or notifying the vertical market business that an owner of the phone 610 (and hence the customer) has entered the vertical market business. Often, the caller identification router 120 (FIG. 1A) may be implemented with one or more wireless chipsets 340, including a Bluetooth® transceiver 620 that can receive and transmit Bluetooth® signals with the cellular phone 610. The cellular phone 610 may then be configured to transmit data through Bluetooth® signals 615 to the Bluetooth® receiver 620. As described above, the application identifier and router identifier are transmitted to the customer relationship management system 150, which recovers and/or generates customer data to provide to the virtual assistant logic 170 being part of a kiosk platform.

Once received, the computing device 175 with the virtual assistant logic 170 installed therein and an interactive display 630 (e.g., touchscreen), which are arranged as a kiosk, are configured to display a customized greeting based on the data received from the cellular phone 610. For this embodiment, the kiosk display 630 may be communicatively coupled with the virtual assistant logic 170 to receive screen displays automatically (or selected by the customer). Also, the kiosk display 630 may be configured to prompt the user for updated data based on events generated by the customer relationship management system 150 which can be input via touchscreen (or via manual input through a mouse and keyboard when the display 630 is non-interactive). The kiosk display 630 can also prompt the user to interact with an application or web page on the cellular phone 610. For example, the kiosk display 630 may prompt the customer to utilize an application on the cellular phone 610 to pay an overdue account balance, to schedule an upcoming appointment, or to receive information related to a potential future purchase.

In the foregoing description, the invention is described with reference to specific embodiments thereof. It will, however, be evident that various modifications and changes may be made thereto without departing from the broader spirit and scope of the invention as set forth in the appended claims.

What is claimed is:

1. An electronic device for automatically identifying customers and generating workflow data comprising:
    a processor; and
    a memory communicatively coupled to the processor, the memory corresponding to a non-transitory storage medium comprises:
        a customer data store configured to store a plurality of customer records;
        management logic corresponding to receive caller identification data and router identification data;
        a segmentation engine configured to:
            identify a customer record within the customer data store in response to the received caller identification data and router identification data;
            generate a first grouping of data associated with the identified customer record wherein the first grouping of data comprises customer record data; and
            transmit the first grouping of data to a practice management system;
        customer analytic logic configured to:
            generate a second grouping of data based on the identified customer record wherein the second grouping of data comprises at least workflow data; and
            transmit the second grouping of data to the practice management system.

2. The electronic device of claim 1, wherein the caller identification data and the router identification data are received from a caller identification router.

3. The electronic device of claim 2, wherein the caller identification router extracts the caller identification data from a received call signal.

4. The electronic device of claim 3, wherein the received call signal corresponds to an incoming call from an analog phone system.

5. The electronic device of claim 3, wherein the received call signal corresponds to an incoming call from a broadband phone system.

6. The electronic device of claim 2, wherein the router identification data comprises unique data assigned to the caller identification router.

7. The electronic device of claim 6, wherein the router identification data is extracted from a non-volatile memory within the caller identification router.

8. The electronic device of claim 1, wherein the second grouping of data comprises workflow data associated with at least one event generated based on the customer record.

9. The electronic device of claim 8, wherein, the memory further comprises a scheduler logic to provide event data associated with available customer appointment times and wherein the event data provided by the scheduler logic is generated based on the identified customer record and is utilized to generate the at least one event data based on the customer record.

10. The electronic device of claim 1, wherein, the memory further comprises leads logic configured to provide event data associated with available customer purchases and wherein the event data provided by the leads logic is generated based on the identified customer record and is utilized to generate the at least one event data based on the customer record.

11. A method of automatically identifying customers and generating workflow data, the method comprising:
receiving caller identification data and router identification data;
identifying a customer record in response to the received caller identification data and the received router identification data;
acquiring a first grouping of data associated with the identified customer record wherein the first grouping of data comprises customer record data;
transmitting the acquired first grouping of data to a practice management system;
generating a second grouping of data based on the identified customer record wherein the second grouping of data comprises at least workflow data; and
transmitting the second grouping of data to the practice management system.

12. The method of claim 11, wherein the caller identification data and the router identification data are received from a caller identification router.

13. The method of claim 12, wherein the caller identification router extracts the caller identification data from a received call signal.

14. The method of claim 13, wherein the received call signal corresponds to an incoming call from an analog phone system.

15. The method of claim 13, wherein the received call signal corresponds to an incoming call from a broadband phone system.

16. The method of claim 12, wherein the router identification data comprises unique data assigned to the caller identification routing device.

17. The method of claim 16, wherein the router identification data is extracted from a non-volatile memory within the caller identification router.

18. The method of claim 11, wherein, in response to no customer record being identified, the method further attempts to identify the received caller identification data within an index of known spam sources.

19. The method of claim 18, wherein, the first grouping of data indicates an incoming call including the caller identification data as a spam call in response to the caller identification data being identified as a known spam source.

20. The method of claim 11, wherein the second grouping of data comprises workflow data associated with at least one event generated based on the customer record.

21. A method of automatically identifying customers and generating workflow data, the method comprising:
receiving customer identification data wirelessly on a caller identification (ID) router;
transmitting the received customer identification data and extracted caller identification router data to a customer relationship management system;
receiving, from the customer relationship management system, a first grouping of data which comprises an identified customer record;
utilizing the received first grouping of data to generate at least one personalized message based on the customer record;
displaying the personalized message on a display, wherein the display is configured for viewing by the customer; and
receiving, from the customer relationship management system, a second grouping of data wherein the second grouping of data comprises at least workflow data.

22. A non-transitory storage medium including customer data store configured to store a plurality of customer records and software configured to automatically identify customers and generating workflow data, the software comprising:
a management logic to receive caller identification data and router identification data;
a segmentation engine to (i) identify a customer record within the customer data store in response to the received caller identification data and the received router identification data, (ii) generate a first grouping of data associated with the identified customer record, wherein the first grouping of data comprises customer record data, and (iii) transmit the first grouping of data to a practice management system; and
a customer analytic logic to (i) generate a second grouping of data based on the identified customer record wherein the second grouping of data comprises at least workflow data, and (ii) transmit the second grouping of data to the practice management system.

23. The non-transitory storage medium of claim 22, wherein the caller identification data and the router identification data are received from a caller identification router, wherein the caller identification router extracts the caller identification data from a received call signal.

24. The non-transitory storage medium of claim 23, wherein the received call corresponds to an incoming call from an analog phone system or a broadband phone system.

25. The non-transitory storage medium of claim 23, wherein the router identification data comprises unique data assigned to the caller identification router.

26. The non-transitory storage medium of claim 22, wherein the second grouping of data comprises workflow data associated with at least one event generated based on the customer record.

27. The non-transitory storage medium of claim 26, wherein the software further comprises a scheduler logic to provide event data associated with available customer appointment times, wherein the event data provided by the scheduler logic is generated based on the identified customer record and is utilized to generate the at least one event data based on the customer record.

28. The non-transitory storage medium of claim 22, wherein the software further comprises a leads logic to provide event data associated with available customer purchases, wherein the event data provided by the leads logic is generated based on the identified customer record and is utilized to generate the at least one event data based on the customer record.

* * * * *